US008422365B2

(12) United States Patent  
Phillips et al.

(10) Patent No.: US 8,422,365 B2
(45) Date of Patent: Apr. 16, 2013

(54) ENERGY EFFICIENT SCALING OF NETWORK APPLIANCE SERVICE PERFORMANCE

(75) Inventors: Steven B. Phillips, San Jose, CA (US); Douglas Gourlay, San Jose, CA (US); Omar Sultan, Elk Grove, CA (US); Dino Farinacci, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 12/563,536

(22) Filed: Sep. 21, 2009

(65) Prior Publication Data

US 2011/0069613 A1 Mar. 24, 2011

(51) Int. Cl.
*H04L 12/26* (2006.01)

(52) U.S. Cl.
USPC .......................................................... 370/229

(58) Field of Classification Search .......... 370/229–235, 370/252; 709/223–226
See application file for complete search history.

(56) References Cited

U.S. PATENT DOCUMENTS

| 6,591,368 | B1 * | 7/2003 | Ryu | 713/323 |
|---|---|---|---|---|
| 6,859,882 | B2 * | 2/2005 | Fung | 713/300 |
| 7,006,450 | B2 * | 2/2006 | Kuster et al. | 370/252 |
| 7,062,559 | B2 * | 6/2006 | Yoshimura et al. | 709/226 |
| 2003/0055971 | A1 * | 3/2003 | Menon | 709/226 |
| 2005/0276263 | A1 * | 12/2005 | Suetsugu et al. | 370/389 |
| 2006/0075139 | A1 * | 4/2006 | Jungck | 709/245 |
| 2008/0304519 | A1 * | 12/2008 | Koenen et al. | 370/477 |
| 2009/0187660 | A1 * | 7/2009 | Kodama et al. | 709/226 |
| 2010/0287390 | A1 * | 11/2010 | Yu | 713/310 |
| 2011/0103246 | A1 * | 5/2011 | Byun | 370/252 |

* cited by examiner

*Primary Examiner* — Chi Pham
*Assistant Examiner* — Robert Lopata
(74) *Attorney, Agent, or Firm* — Merchant & Gould

(57) ABSTRACT

Systems and methods for automatically controlling efficient operation of a plurality of network appliances operatively linked and networked to balance network traffic load across a plurality of network appliances that are selectively enabled. The system facilitating performance of the method includes at least a plurality of network appliances operatively connected to a switch and controlled by a network access control module. During system operation, at any given moment in time, the plurality network appliances operate in one of two modes, fully operational or stand-by. The network appliances of the plurality that are fully operational and thereby consuming full operational power depends upon the network traffic load at any given moment in time. The network appliances functioning in a stand-by mode consume low power levels which are sufficient to allow a network appliance in stand-by mode to receive a command signal directing it to switch from stand-by to full operational mode.

20 Claims, 9 Drawing Sheets

ENERGY EFFICIENT SCALING OF NETWORK APPLIANCE SERVICE PERFORMANCE

TECHNICAL FIELD

The present disclosure generally relates to efficient load balancing of network appliances.

BACKGROUND

As businesses realize the efficiencies enabled by high-speed communications, in order to remain competitive, they are tasked with building high-speed networks and data centers that will allow them to take advantage of the rapid deployment of countless software-based applications and services entering the marketplace. One of the problems with building these networks is that they are based on standard packet technologies, such as Ethernet and IP. In a relatively short time, these networks have moved from 100 Mbps to 1 Gbps backbones. Just as quickly, many networks are beginning to move to 10 Gbps, with designs for the next generation of Ethernet promising to deliver data transfer rates between 40 Gbps to 100 Gbps. This exponential swell in network performance is occurring with the anticipation that businesses will be able to provide the bandwidth necessary to support a growing list of IP applications and services having strict bandwidth performance requirements.

These Gigabit and 10 Gigabit Ethernet networks and data centers expose businesses to millions of packets of information per second, comprised of numerous protocols, applications and services. These data rates make it difficult for businesses to guarantee network and application performance, as well as manage, secure and control the overall network usage while protecting against threats and unacceptable practices using traditional network appliances due to mis-matched performance. One method of guaranteeing network and application performance is to scale network appliance (such as firewall, server load-balancers, etc.) performance in high bandwidth data centers. However, building a network that solves the bandwidth problem by scaling the network appliances often leads to over provisioned and energy inefficient designs.

BRIEF DESCRIPTION OF THE FIGURES

Non-limiting and non-exhaustive embodiments are described with reference to the following figures, wherein like reference numerals refer to like parts throughout the various views unless otherwise specified.

DESCRIPTION OF EXAMPLE EMBODIMENTS

Overview

Figure 1:
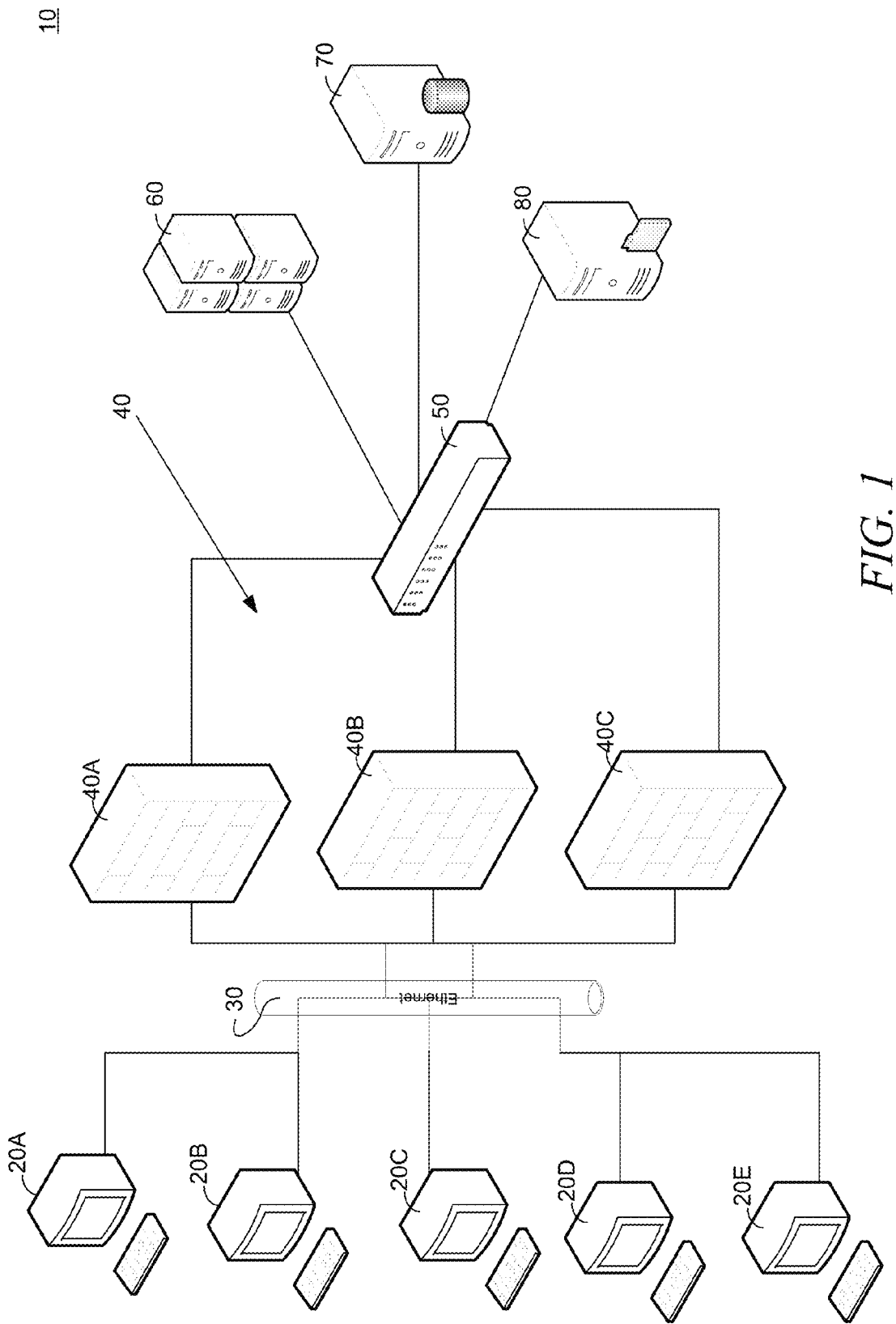
FIG. 1 depicts a network diagram illustrating a system configuration for performing energy efficient scaling of network appliances.

In one method embodiment, a method of automatically controlling efficient operation of a plurality of network appliances operatively linked to share traffic within a network, wherein the number of network appliances of the plurality that are receiving sufficient power for standard operation is dependent upon network traffic load at a given moment in time flowing through the plurality of network appliances, the method comprising: monitoring, by a network appliance capacity module, the load of the network traffic across the plurality of network appliances, and upon determining by the network appliance capacity module, that the network traffic load across the plurality of network appliances exceeds a maximum load threshold level, the network appliance capacity module transmitting a signal to a network access control module causing at least one of the plurality of network appliances operating in stand-by mode to be awakened.

Example Embodiments

A system and method of automatically controlling efficient operation of a plurality of network appliances operatively linked to share the load of network traffic within a network is disclosed. The system facilitates the method of efficient load sharing of network traffic by selectively controlling the number of network appliances of the plurality of network appliances that are fully operative and thereby incrementally increasing or decreasing aggregate throughput of load capacity through the plurality of network appliances. Each of the plurality of network appliances has at least two modes of operation. In one embodiment the modes of operation include a standard operational mode and a stand-by mode. A standard operational mode is characterized by the network appliance utilizing sufficient power to perform standard network appliance operations. In stand-by mode (sleep mode), the network appliance operates in a low power mode, characterized by a substantial reduction in electrical power consumption in comparison to power consumed by a network appliance operating in standard operational mode. Instead of over provisioning the plurality of network appliances' aggregate capacity, network appliances are provisioned in accordance with the capacity needed to satisfy the network traffic load. All other network appliances function in stand-by mode, wherein the power supplied to all unneeded parts of the network appliance is disabled. It is also contemplated that the stand-by mode of operation may be a hibernation mode in alternative embodiments.

The system that performs the method of the present disclosure is comprised of at least a network switch, including a network access control module and a plurality of network appliances, each of which includes a network appliance capacity module. The network switch is operatively connected to the plurality of network appliances which are linked and configured to share the load of network traffic being transmitted through the network. During network operations, each network appliance monitors its own load through the network appliance capacity module operating thereon. Through the network appliance capacity module, the network appliance transmits signals to the network access control module within the switch when certain network traffic load thresholds are reached. This causes the network access control module to facilitate the turning on or off of individual network appliances based upon network traffic load. This simplifies state tracking and reporting requirements as the network access control module responds to stimulus received from the plurality of network appliances. The network access control module also facilitates efficient power consumption management by selectively controlling the mode of operation of each of the plurality of network appliances at any given moment in time in order to provision the plurality of network appliances to optimal levels of network appliance capacity. The modes of operation shall include but not be limited to stand-by and full operational modes.

Various embodiments are described more fully below with reference to the accompanying drawings, which form a part hereof, and which show specific embodiments of the disclosure. However, embodiments may be implemented in many different forms and should not be construed as limited to the embodiments set forth herein; rather, these embodiments are provided so that this disclosure will be thorough and complete, and will fully convey the scope of the disclosure to those skilled in the art. Accordingly, the following detailed description is, therefore, not to be taken in a limiting sense.

Reference may be made throughout this specification to "one embodiment," "an embodiment," "embodiments," "an aspect," or "aspects" meaning that a particular described feature, structure, or characteristic may be included in at least one embodiment of the present disclosure. Thus, usage of such phrases may refer to more than just one embodiment or aspect. In addition, the described features, structures, or characteristics may be combined in any suitable manner in one or more embodiments or aspects. Moreover, reference to a single item may mean a single item or a plurality of items, just as reference to a plurality of items may mean a single item.

Referring to FIG. 1, a plurality of users may attempt to access the network 10 through a plurality of computers 20A, 20B, 20C, 20D, including but not limited to desktop computers, laptop computers, PDAs, and other electronic devices that facilitate network 10 access. In accessing the network through, for instance, an Ethernet connection 30, computers 20A, 20B, 20C, 20D shall gain access to software applications and services on network servers 60, 70, 80 through network appliance devices 40A, 40B, and 40C. In the embodiment illustrated, network appliance devices 40A, 40B, 40C are firewall devices. Once a user is cleared for network entry through the firewall, 40A, 40B, 40C, the network traffic is routed by a switch 50.

As illustrated in the embodiment shown in FIG. 1, there are three network appliance devices 40A, 40B, 40C, which operate in concert with the operational mode commands transmitted by a network access control module operative on the switch 50. Each of the three network appliance devices 40A, 40B, 40C are equipped with Wake-On-LAN, an Ethernet computer networking standard that allows each of network appliance devices 40A, 40B, 40C, to be turned on or awakened by a network message. Generally, the message to wake up a computer is usually sent by a simple program executed on another computer on the local area network. In the present embodiment, the message to wake up one of the three network appliance devices 40A, 40B, and 40C is sent by the switch 50 following the network access control module within the switch receiving a signal indicating that a network appliance has exceeded a defined network traffic load capacity threshold level. Following the network access control module receiving a signal from a network appliance, the network access control module causes the switch 50 to execute a simple Wake-On-LAN program. The simple Wake-On-LAN program prompts the switch 50 to transmit a message to wake up one of the three network appliance devices 40A, 40B, and 40C.

For purposes of further describing an embodiment and the operation of the system illustrated in FIG. 1, it shall be assumed that the maximum network traffic load that may be handled by any one of the three network appliance devices 40A, 40B, and 40C is ten gigabits per second. In the embodiment illustrated, each network appliance includes a network appliance capacity module that is programmed to monitor and provide notice of when the network traffic load on the active network appliance device 40A exceeds eighty percent of the maximum threshold load level of ten gigabits per second. During operation, the network appliance capacity module monitors the network traffic load on network appliance device 40A. In addition, the network appliance capacity module is programmed to monitor and provide notice of when the network traffic load on a network appliance device such as device 40A falls below a minimum threshold level. In this example the minimum threshold level shall be thirty five percent of the maximum threshold load level of ten gigabits per second.

By way of further example, assume that the network traffic load across the network is five gigabits per second. Under this circumstance, the network appliance shall determine that the network traffic load is below the threshold level requiring operation of more than one of the three network appliance devices 40A, 40B, 40C and would not transmit a signal to place network appliance devices 40B and 40C into an active mode. Maintaining network appliance devices 40B and 40C in stand-by mode causes network appliance devices 40B and 40C to operate in a low power mode, wherein system wide, there is a substantial reduction in electrical power consumption because of the reduction of power consumed by network appliances 40B and 40C. Accordingly, when network appliances 40B and 40C are in stand-by mode, in this example the system is functioning with only one active network appliance 40A of the plurality of network appliances 40.

Referring to FIG. 1, at some first future point in time, the network traffic load caused by computers 20A, 20B, 20C, 20D on the network 10 may be nine gigabits per second, which is ninety percent of the maximum threshold load level of ten gigabits per second of the one network appliance device 40A. Under such circumstances, the network appliance capacity module shall determine that the network traffic load on network appliance 40A exceeds a load threshold level, prompting the transmission of a stimulus message to activate more network appliances to the network access control module. The network access control module will initiate a Wake-On-LAN signal to one of the network appliance devices operating in stand-by mode 40B and 40C. In this example, the Wake-On-LAN signal is transmitted to network appliance device 40B, which is awakened and begins to operate in its full operational mode, causing an increase in power consumption. Because switch 50 facilitates load balancing of the nine gigabits per second of network traffic load, each of network appliance devices 40A and 40B shall receive approximately four and one half gigabits per second of network traffic load.

At some second future point in time, the network traffic load caused by computers 20A, 20B, 20C, 20D on the network 10 may be eighteen gigabits per second, wherein each of the two network appliance devices 40A and 40B has nine gigabits per second or ninety percent of their respective maximum traffic threshold load level. Because each of the two network appliance devices 40A and 40B includes a network appliance capacity module, during operation, the network appliance capacity modules on the two network appliance devices 40A and 40B monitors the network traffic load on each network appliance device 40A, 40B. Under such circumstances, the network appliance capacity modules on each network appliance device 40A, 40B shall determine that the network traffic load on each network appliance device 40A, 40B exceeds a maximum load threshold level, prompting transmission of a stimulus message to activate more network appliances to the network access control module within the switch. The network access control module will initiate a Wake-On-LAN signal to one of the network appliance devices operating in stand-by mode 40C. Network appliance device 40C awakens and begins to operate in its full operational mode, causing an additional increase in power consumption. Because switch 50 facilitates load balancing of the eighteen gigabits per second of network traffic load, each of network appliance devices 40A, 40B and 40C shall receive approximately six gigabits per second of network traffic load.

It is contemplated that the number of the plurality of network appliances 40 shall be determined by the peak load level generally encountered by a network. For example, in the embodiment illustrated in FIG. 1, if the peak load level on the plurality of network appliances 40 at any point in time is approximately 45 gigabits per second, the maximum number of network appliances necessary within the plurality of network appliances 40 shall be six. At peak network load, 42 gigabits per second, there shall be six network appliances fully operational. Because the network appliances shall be load balanced, each network appliance shall have seven gigabits per second of network traffic load and operate below the maximum threshold load level of eight gigabits per second of network traffic.

Referring back to the example in FIG. 1, when the network traffic load caused by computers 20A, 20B, 20C, 20D on the network 10 is eighteen gigabits per second and each of network appliance devices 40A, 40B and 40C are fully operational and receiving approximately six gigabits per second of network traffic load, the network appliance capacity modules on the three network appliance devices 40A, 40B and 40C monitors the network traffic load on each network appliance device. At another future point in time, the network traffic load caused by computers 20A, 20B, 20C, 20D on the network 10 may be reduced from eighteen gigabits per second, which is sixty percent of the maximum shared threshold load level of thirty gigabits per second of the three network appliance devices 40A, 40B and 40C, to seven gigabits per second. Accordingly, the shared threshold load level of the three network appliance devices 40A, 40B and 40C is two and one third gigabits per second Under such circumstances, the network appliance capacity modules on the three network appliance devices 40A, 40B and 40C shall determine that the network traffic load on the plurality of network appliances 40, is less than the thirty percent minimum threshold load level required to maintain operation of all three network appliance devices 40A, 40B and 40C. Under such circumstances, the network appliance capacity modules on each network appliance device 40A, 40B and 40C shall determine that the network traffic load on each network appliance device 40A, 40B and 40C falls below a minimum load threshold level, prompting transmission of a stimulus message to de-activate one of the network appliance devices to the network access control module within the switch 50. The network access control module will initiate prompting the initiation of a simple sleep mode application of the wake on LAN program to be executed on the switch 50. The switch 50 then sends a signal to one of the three network appliance devices 40A, 40B and 40C, all of which are fully operational to place one of the three network appliances in stand-by mode. In this example, the network appliance device to which the sleep mode signal shall be sent is network appliance device 40C. Network appliance device 40C is transformed into a low power mode of operation, characterized by a substantial reduction in electrical power consumption.

Instead of leaving a network appliance 40C fully operational and idle, when network appliance devices 40A and 40B are equipped to handle the network traffic load of 8 gigabits per second, stand-by mode is initiated on network appliance device 40C whereby the operational power being supplied to network appliance device 40C is cut to all unneeded parts. Because switch 50 facilitates placing network appliance device 40C into a stand-by mode, in which network appliance device 40C does not share the network traffic load, the eight gigabits of network traffic is load balanced across network appliance devices 40A and 40B, each of which shall receive approximately four gigabits per second of network traffic load. Additionally, when the network traffic load caused by computers 20A, 20B, 20C, 20D on the network 10 is reduced from eight gigabits per second, which is forty percent of the maximum shared threshold load level of twenty gigabits per second of the two network appliance devices 40A and 40B, to five gigabits per second, the shared threshold load level of the two network appliance devices 40A and 40B is two and one half gigabits per second Under such circumstances, the network appliance capacity modules on each network appliance device 40A and 40B shall determine that the network traffic load on each network appliance device 40A and 40B falls below a minimum load threshold level, prompting transmission of a stimulus message to de-activate one of the network appliance devices to the network access control module within the switch 50. The network access control module will initiate the simple sleep mode application of the Wake-On-LAN program to be executed on the switch 50. This results in network appliance device 40B being placed into a stand-by mode, in which network appliance device 40B does not share the network traffic load. Accordingly, the five gigabits of network traffic is load balanced across network appliance device 40A.

Referring now to the FIG. 2, switching infrastructure currently used in the industry facilitates the transmission of millions of packets of data per second without any problems. However, network appliances, such as those that perform server load balancing services, firewall services, or intrusion prevention services, typically may only transmit tens of thousands of packets per second. In an environment where network appliances serving as firewalls, load balancing devices and intrusion prevention equipment need to be scaled in order to facilitate packet transmission rates consistent with existing switching infrastructure, it is necessary to provision multiple network appliances in order to match the capacity needed during periods when the network traffic load is at its peak. One problem with current methodologies used is that, for example, if peak network traffic load is attained for 20 minutes during most mornings within a network, for the rest of the day many of the network appliances that are provisioned to meet the network traffic load during the network traffic peak period will be idle, powered on and active. Accordingly, resources will need to be allocated to manage these idle, powered on and active network appliances, even though they may not be necessary to manage network traffic loads during most of a given day. Certain embodiments of the present disclosure solves the inefficiency problem caused by idle network appliances which are actively powered and fully operational by using information reported to the switch 50 regarding the amount of load capacity actually being used by each network appliance device. In one embodiment, the network appliance may include a network appliance capacity module that monitors and facilitates the reporting of information to the network access control module within the switch 50 regarding a network appliance's load capacity utilized. Certain embodiments of the present disclosure use the information regarding the amount of a network appliance's capacity being used within a network at any given moment in time in order to facilitate turning network appliance devices on and off in response to network traffic load, thereby creating a system having optimal network appliance provisioning.

Figure 2A:
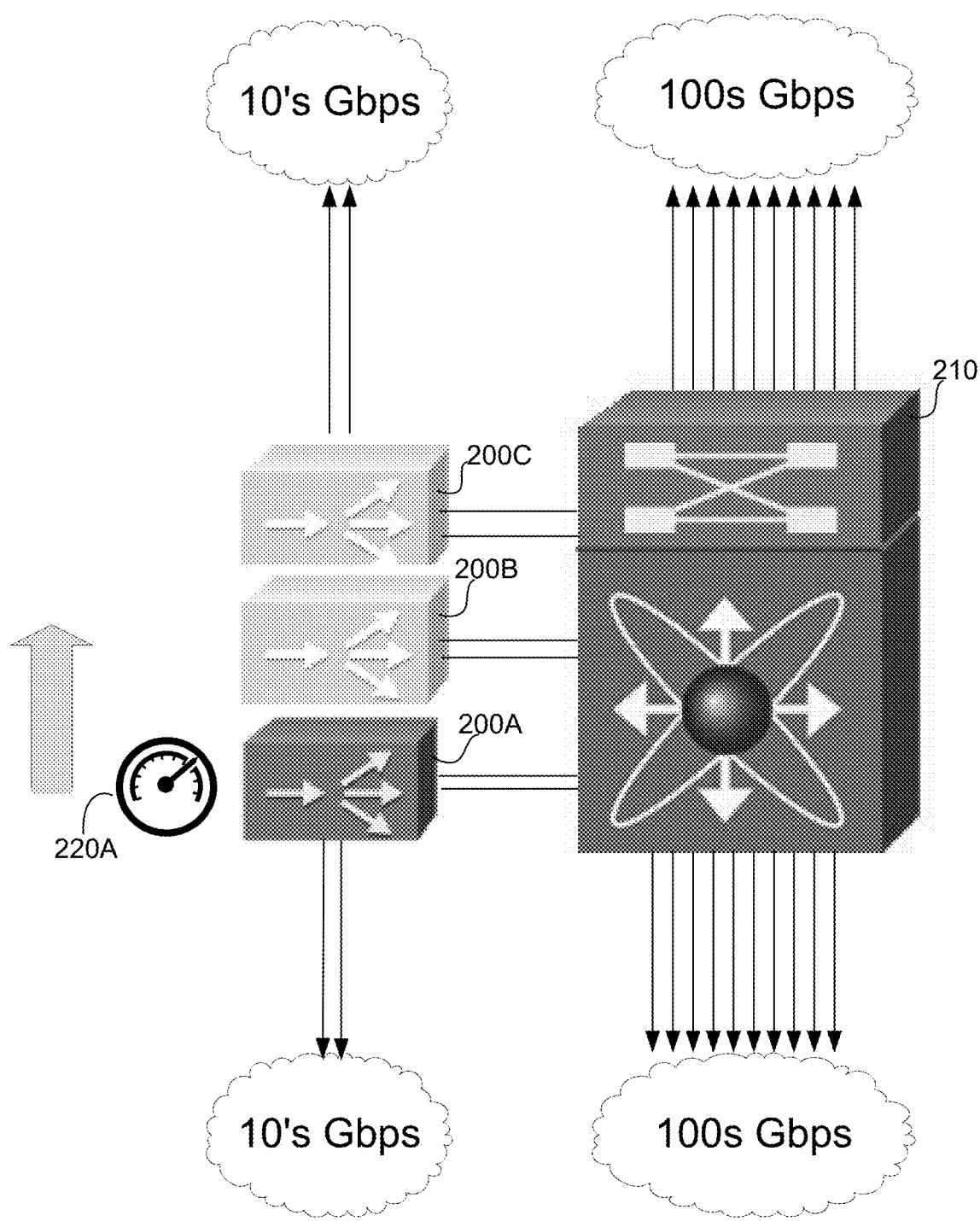
FIG. 2A-2F depicts component communication configuration of a plurality of load balanced network appliances and a switch as part of a network system configured to perform energy efficient scaling of the plurality of network appliances.
Figure 2B:
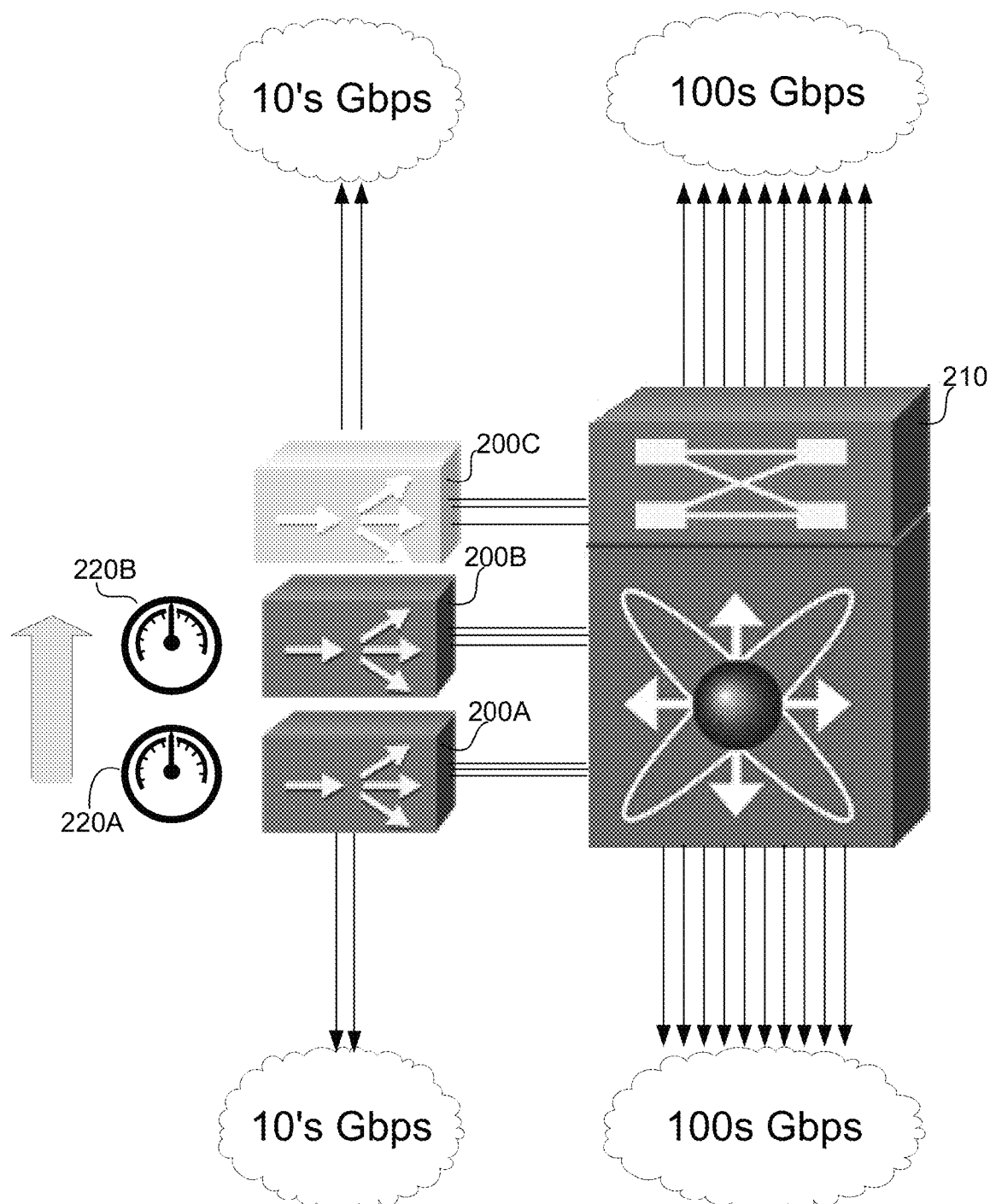

FIGS. 2A-2F illustrate the progression of how network appliance devices which were previously in stand-by mode are brought on line in support of increased network load capacity across the plurality of network appliances and how network appliance devices which are in full operational mode are taken off-line as a result of receiving a signal directing the network appliance to transition into stand-by mode. FIG. 2A illustrates a portion of a network having three network appliances, 200A, 200B and 200C. Network appliance 200A functions in full operational mode, while network appliances 200B and 200C function in stand-by mode and are thereby inactive. During operation, network appliance 200A reports its network load capacity utilized, as reflected on monitor display 220A, to the upstream switch 210. When network appliance 200A reaches a defined threshold, for example eighty percent of its network load capacity, it will transmit a signal to the upstream switch 210 indicating that network appliance 200A is running out of capacity to handle network traffic load as it is approaching the maximum load threshold level. Using a Wake-On-LAN module, switch 210 is configured to transmit a signal facilitating the switching on of an additional network appliance, such as either network appliance 200B or 200C, in order to increase network traffic load capacity. When the second network appliance is brought on line, as illustrated in FIG. 2B, network appliances 200A and 200B are configured to load share sessions and load balance network traffic between the two network appliances 200A and 200B, as reflected on monitor displays 220A and 220B. Accordingly, this methodology facilitates the addition of network traffic load capacity upon demand. This methodology is extremely efficient when understood in the context of prior systems functionality, which is to provide maximum network load capacity at all times, regardless of network traffic load.

Figure 2C:
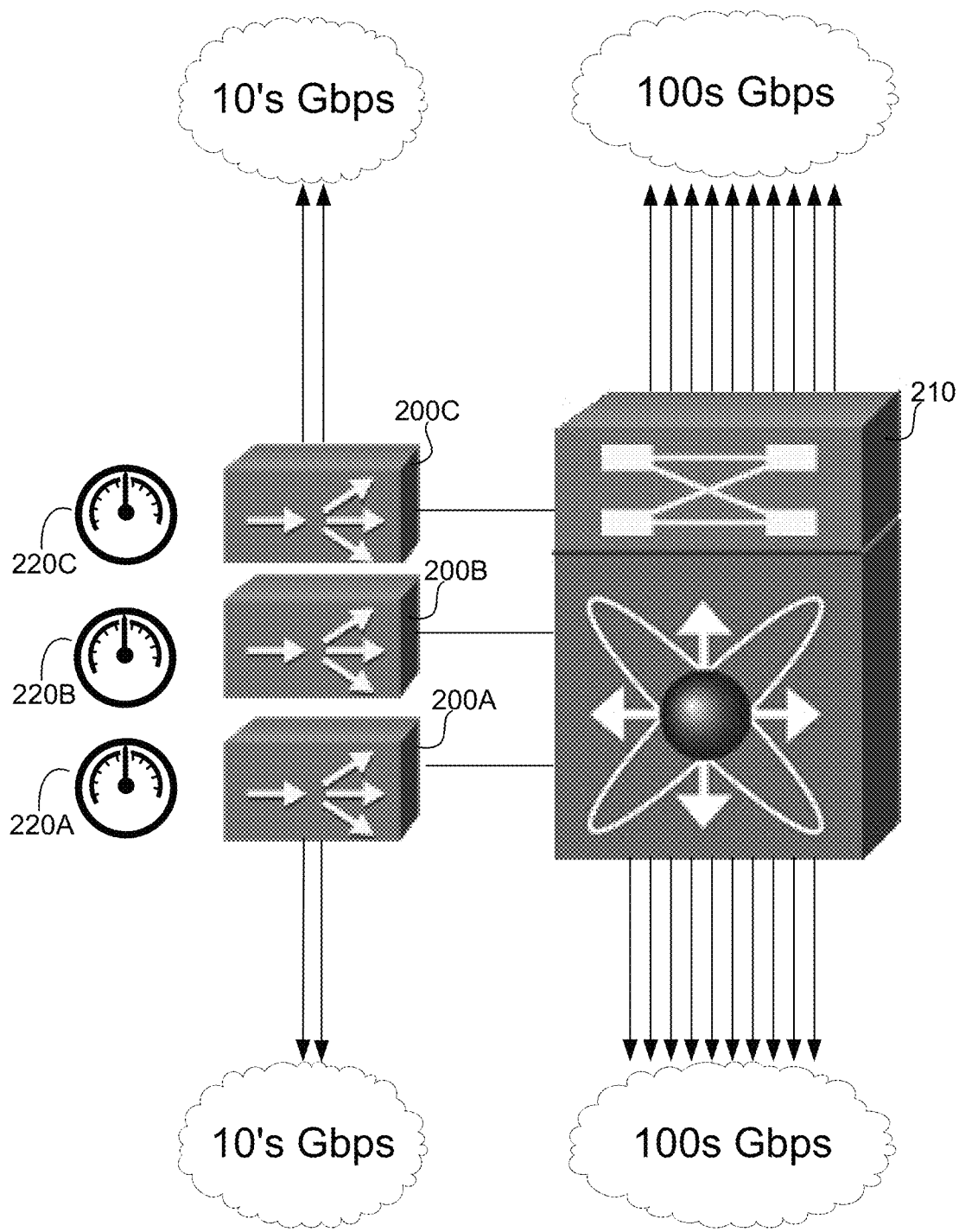

When network traffic load across network appliances 200A and 200B, which are load balanced, exceed a defined load threshold, for example eighty percent of the combined network load capacity of network appliances 200A and 200B, one or both of network appliances 200A and 200B shall transmit a signal to the upstream switch 210 indicating that network appliances 200A and 200B are running out of capacity to handle the network traffic load. Using a Wake-On-LAN module, switch 210 is configured to transmit a signal facilitating the switching on of an additional network appliance, such as network appliance 200C, in order to increase network traffic load capacity. When the additional network appliance is brought on line, as illustrated in FIG. 2C, network appliances 200A, 200B and 200C are configured to load share sessions and load balance network traffic between the plurality of network appliances 200A, 200B and 200C, as reflected on monitor displays 220A, 220B and 220C.

As the load capacity of the plurality of network appliances drops down as a result of less utilization, the system provides a method for turning off the port at one of the plurality of network appliances, placing one of the network appliances in stand-by mode and then rebalancing the network traffic between the remaining network appliances to maintain operation. This functionality is illustrated in FIG. 2D-2F when the network traffic load across network appliances 200A, 200B and 200C is reduced over time.

Figure 2D:
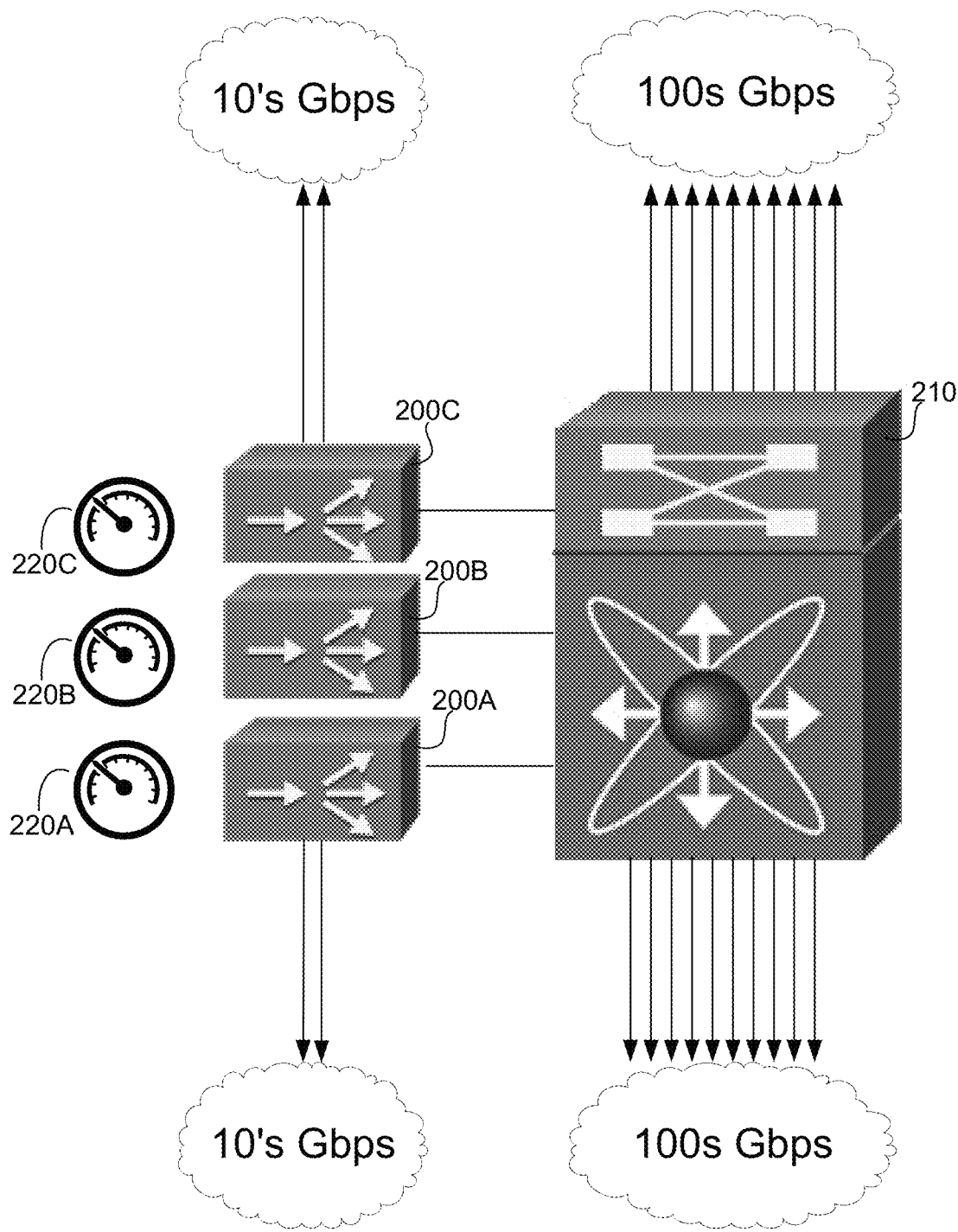
Figure 2E:
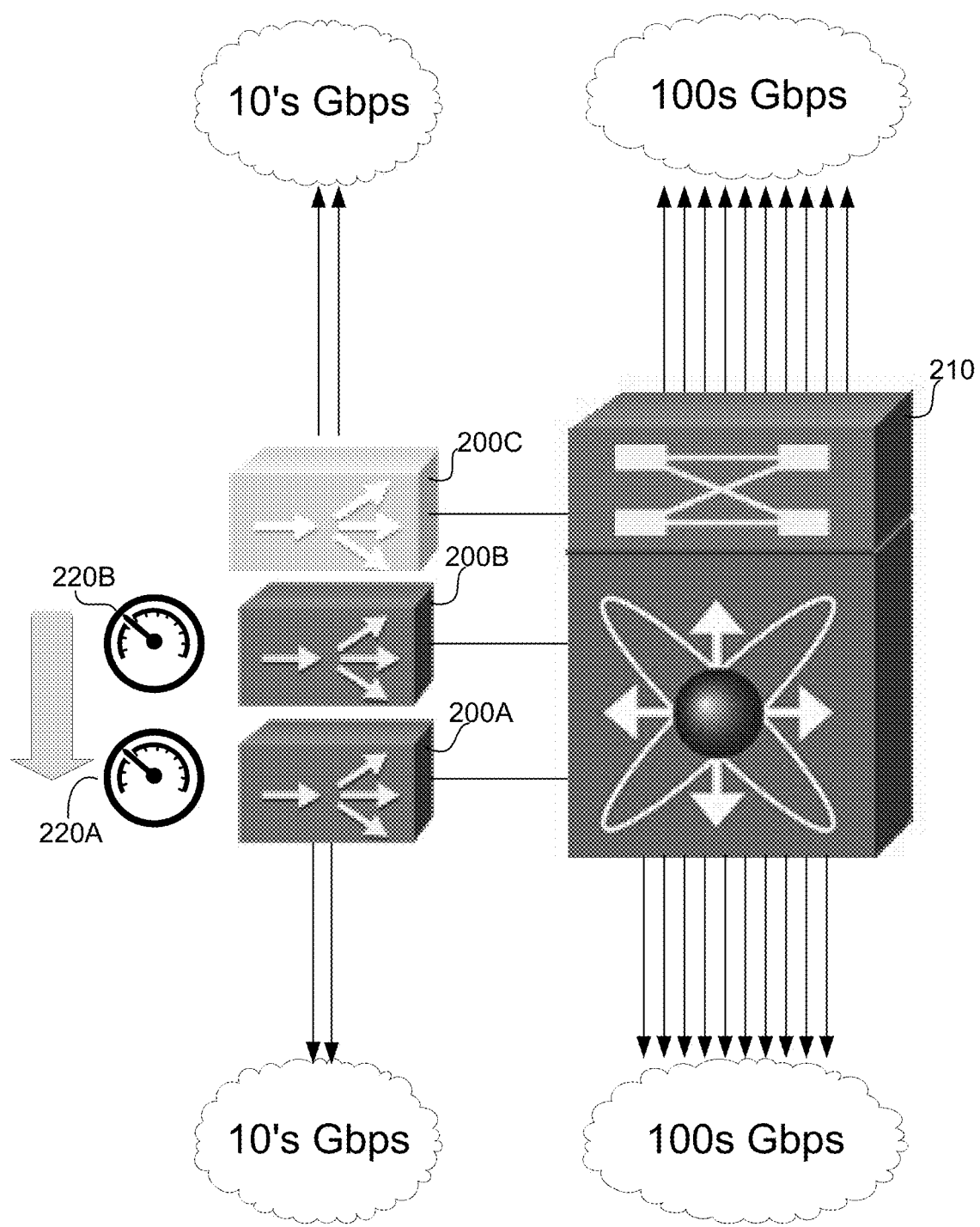
Figure 2F:
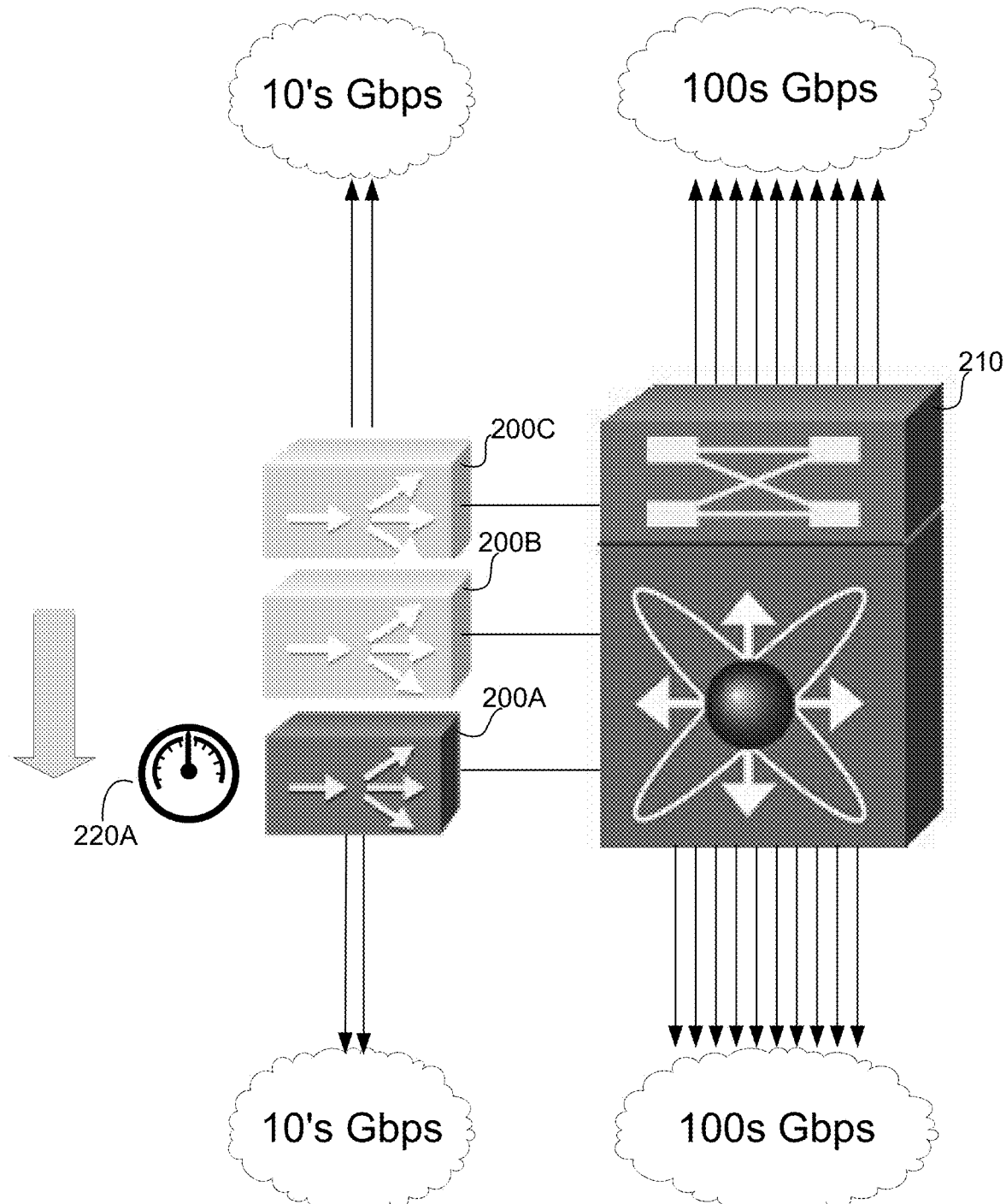

Referring to FIG. 2D, as illustrated, when network traffic load across network appliances 200A, 200B and 200C, which are load balanced, falls below a defined minimum load threshold, for example thirty percent of the combined network load capacity of network appliances 200A, 200B and 200C, at least one of network appliances 200A, 200B and 200C shall transmit a signal to the upstream switch 210 indicating that network appliances 200A, 200B and 200C have too much capacity for the traffic load on the network, as reflected on monitor displays 220A, 220B and 220C. Using a Wake-On-LAN module, switch 210 is configured to transmit a signal facilitating the switching of one of network appliances 200A, 200B and 200C to a stand-by mode of operation, in order to decrease network traffic load capacity. When one of the network appliances is transitioned to stand-by mode, as illustrated in FIG. 2E, network appliances 200A and 200B are configured to load share sessions and load balance network traffic between the two network appliances 200A and 200B.

When the network traffic load across network appliances 200A and 200B, which are load balanced, falls below a defined minimum load threshold, as is reflected on monitor displays 220A and 220B, at least one of network appliances 200A and 200B shall transmit a signal to the upstream switch 210 indicating that network appliances 200A and 200B have too much capacity for the traffic load on the network. Using a Wake-On-LAN module, switch 210 is configured to transmit a signal facilitating the switching of one of network appliances 200A and 200B to a stand-by mode of operation, in order to decrease network traffic load capacity. When network appliance 200B is transitioned to stand-by mode, as illustrated in FIG. 2F, network appliance 200A is configured to load balance the remaining network traffic as reflected on monitor displays 220A.

Figure 3:
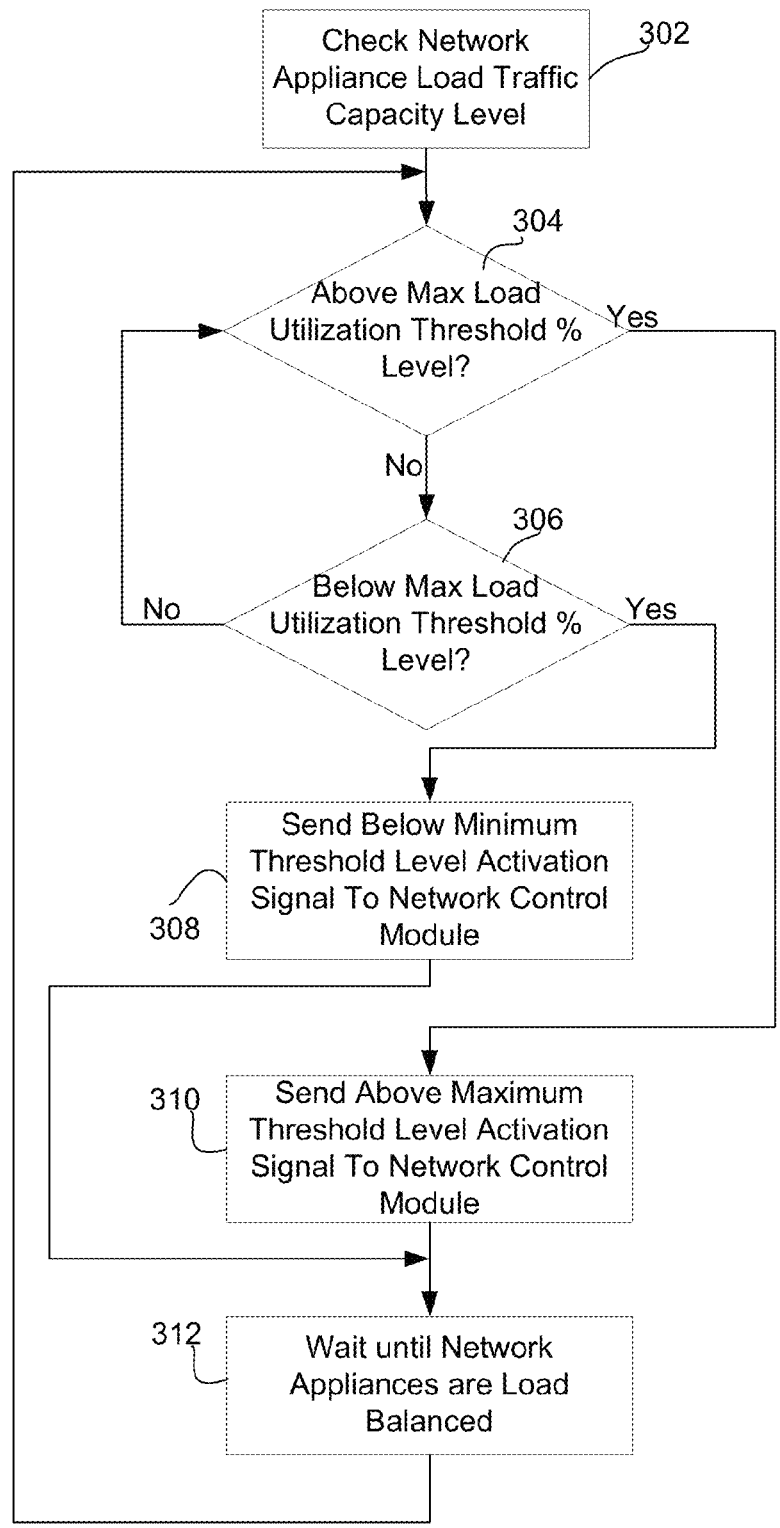
FIG. 3 illustrates a process flow performed by the network appliance capacity module configured for scaling the efficient use of a plurality of network appliances during non-peak and peak usage times.

FIG. 3 illustrates the process flow within the network appliance capacity module stored on each network appliance. As illustrated, the network appliance capacity module constantly checks the network traffic load on a network appliance 302. When the network traffic load is not above a maximum threshold utilization level 304, it checks to see if the network traffic load is below a minimum threshold utilization level 306. When the network traffic load is above a maximum threshold utilization level 304, it sends a signal indicating that the maximum threshold level of a network appliance's capacity has been exceeded 310. This signal causes the switch to initiate the awakening of one of the plurality of network appliances operating in stand-by mode. While an additional network appliance is being brought on line by the switch to share the network traffic load, the network appliance capacity module waits for a period of time 312 to allow the network appliances to load balance the network traffic load across the existing network appliances and the newly added network appliance. After the network appliances are load balanced, the network appliance capacity module cycles to the beginning of its routine to determine whether the network traffic is above a maximum utilization threshold level 304 or below a minimum utilization threshold level 306. When the network traffic load is below a maximum threshold utilization level 304, and below a minimum threshold utilization level 306, it sends a signal indicating that the network traffic load on a network appliance is below a minimum threshold level 308. This signal causes the switch to initiate the processes of pulling one of the plurality of network appliances off-line and into a stand-by mode. While an additional network appliance is being brought off-line by the switch to reduce network appliance capacity, the network appliance capacity module waits for a period of time to allow the network appliances to load balance the network traffic load across the remaining network appliances after one of the plurality of network appliances has been removed 312. After the network appliances are load balanced, the network appliance capacity module cycles to the beginning of its routine to determine whether the network traffic is above a maximum utilization threshold level 304 or below a minimum utilization threshold level 306.

Figure 4:
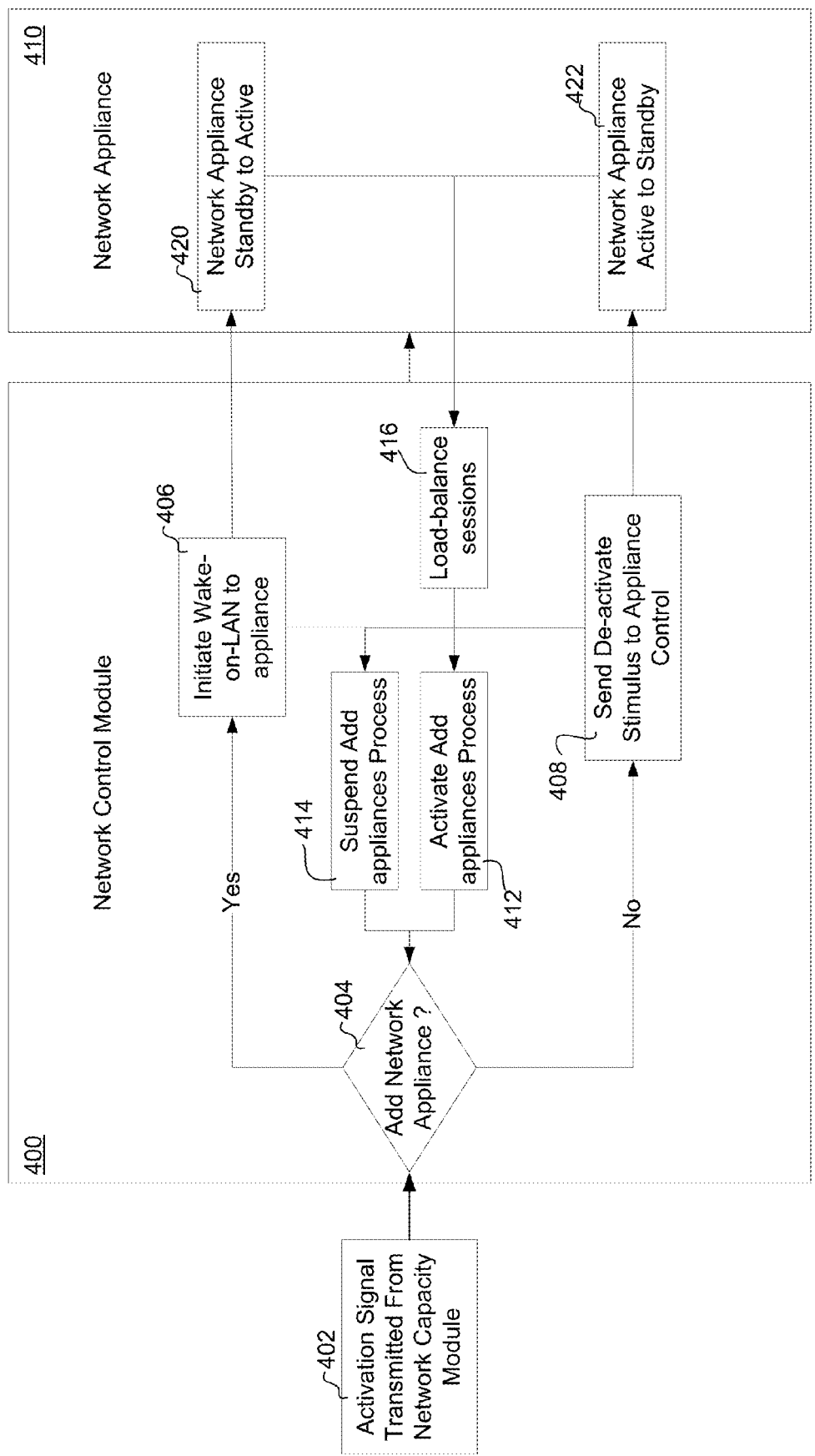
FIG. 4 illustrates a process flow performed by the network access control module configured for scaling the efficient use of a plurality of network appliances during non-peak and peak usage times.

FIG. 4 illustrates the process flow that occurs within the network access control module 400. Following an activation signal being transmitted from a network appliance capacity module 402 to the network access control module 400, the network access control module processes the signal to determine whether the signal is an instruction to add a network appliance 404. If the signal transmitted indicates that a network appliance should be added 404, the network access control module 400 causes initiation of a Wake-On-LAN program 406 within the switch that causes a Wake-On-LAN message to be transmitted to the network appliance 410. Following the transmission of a Wake-On-LAN message to a network appliance 410 operating in stand-by mode, the network appliance transitions from stand-by mode to full operational mode 420. While the network appliance is transitioning, the network access control module 400 suspends the ability for additional network appliances to be added 414 for a defined period of time. In the present embodiment, suspension occurs until the network access control module 400 receives a signal 416 from at least one network appliance 410 that indicates that the plurality of network appliances have been load balanced. After the plurality of network appliances have been load balanced, the add network appliances suspension is lifted and the ability to add network appliances is activated 412. This suspension process is necessary because in one embodiment, each network appliance may transmit a signal indicated that its maximum or minimum threshold level has been exceeded. Accordingly, the suspend add appliances process 414 is necessary to allow the plurality of network appliances to be load balanced before consideration of adding additional network appliances will be performed by the network access control module 400.

If the signal transmitted is not one indicating that a network appliance should be added 404, it is one indicating that one of the plurality of network appliances needs the pulled off line and into stand-by mode. The transmission of a signal requesting placement of a network appliance in stand-by mode causes transmission of a de-activate stimulus 408 from the network access control module to the network appliance 410. Following the transmission of a de-activate stimulus 408 to a fully operational network appliance 410, the network appliance transitions from full operational mode to stand-by mode 422. While the network appliance is transitioning, the network access control module 400 suspends the ability for additional network appliances to be added 414 until the network access control module 400 receives a signal 416 from at least one network appliance 410 indicating that the plurality of network appliances have been load balanced. After the plurality of network appliances have been load balanced, the add network appliances suspension is lifted and the ability to add or remove network appliances is activated 412.

Consistent with certain embodiments of the present disclosure, methods and systems for automatically controlling efficient operation of a plurality of network appliances operatively linked and networked to balance the load of traffic within the network across the network appliances of the plurality that are selectively enabled. In systems that facilitate performance of the method there are a plurality of network appliances operatively connected to a switch and controlled by a network access control module within the switch. During system operation, at any given moment in time, all or at least one of the plurality network appliances may be fully operational. The number of the plurality of network appliances that are fully operational and receiving full operational power is dependent upon the network traffic load at a given moment in time. The network appliances that are not fully operational function in a low power consumption/stand-by mode.

During operation, each network appliance has a network appliance capacity module that monitors the network traffic load on each network appliance. Upon determining that the network traffic load across one of the fully operational network appliances exceeds a defined maximum threshold level, the network appliance capacity module within the network appliance transmits a signal to the adjacent switch indicating that additional capacity is required. The network appliance control module within the switch processes the signal and identifies an available network appliance of the plurality of network appliances operating in stand-by mode and transmits a stimulus to the identified network appliance causing the network appliance identified to initiate full functionality and utilization of full operational power. When at least two fully operational network appliances of the plurality of network appliances are receiving full operational power and it is determined that at least one of these at least two fully operational network appliances has a network traffic load that is below a minimum load threshold level, a below capacity signal is transmitted by the network appliance capacity module of the network appliance that has a network traffic load that is below the minimum threshold level to the adjacent switch indicating that the network appliance has too much capacity. The network access control module within the switch processes the signal and transmits a stimulus to the network appliance commanding the network appliance transmitting the below capacity signal into stand-by mode, and thereby reducing the power previously being consumed by the network appliances.

This written description uses examples to disclose the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method of automatically controlling efficient operation of a plurality of network appliances operatively linked to share traffic within a network comprising:
    monitoring, by a network appliance capacity module located on a network appliance, the load of the network traffic on the network appliance;
    upon determining, by the network appliance capacity module, that the network traffic load on the network appliance exceeds a predetermined maximum load threshold level, the network appliance capacity module transmitting a signal to a network access control module (NACM) located on a nearest upstream switch, wherein the NACM is configured to generate a signal causing at least one of a plurality of network appliances connected to the switch and operating in stand-by mode to be awakened, and wherein the NACM is further configured to suspend an ability for additional network appliance to be awakened for a predetermined period of time; and
    distributing, in approximately equal portions, the network traffic among the plurality of network appliances that are awake.

2. The method of claim 1, wherein upon determining, by the network appliance capacity module, that the network traffic load on the network appliance is below a predetermined minimum load threshold level, at least one of said network appliances connected to the switch and operating in a standard operational mode shall be transitioned to a stand-by mode of operation.

3. The method of claim 1 wherein monitoring, by the network appliance capacity module, comprises monitoring the load of the network traffic across the network appliances of the plurality of network appliances that are receiving full operational power.

4. The method of claim 1 wherein the network appliance capacity module is operative on each of the plurality of network appliances and determines the network traffic load across the network appliance upon which the network appliance capacity module is operative and transmits a signal indicating that the network traffic load on the network appliance upon which the network appliance capacity module is operative has been exceeded.

5. The method of claim 1 wherein a portion of the network access control module is within the switch.

6. The method of claim 1 wherein at least one of the plurality of network appliances is receiving full power and operating in standard operational mode and the remaining network appliances are receiving sufficient power to operate in a stand-by mode of operation.

7. The method of claim 1 wherein the network access control module communicates with at least one of the plurality of network appliances that is not receiving full operational power through use of Wake-On-LAN causing the network appliances that is not receiving full operational power to transition from stand-by mode to standard operational mode.

8. A method of automatically controlling efficient operation of a plurality of network appliances linked to share network traffic load within a network, the method comprising:

operatively connecting the plurality of network appliances to a switch within the network, wherein the number of network appliances of the plurality of network appliances that are fully operational is dependent upon the network traffic load;

monitoring, by a network appliance capacity module located on each of the plurality of network appliances, of the network traffic load on each of the plurality of network appliances, wherein upon determining that the network traffic load across at least one of said network appliances receiving full operational power exceeds a predetermined maximum load threshold level, the network appliance capacity module transmits a first signal to a network access control module (NACM) located on the switch, wherein the NACM is configured to cause a first new network appliance of the plurality of network appliances operating in stand-by mode to become fully operational, and wherein the NACM is further configured to suspend an ability for additional network appliance to be awakened for a predetermined period of time; and balancing network traffic load across all fully operational network appliances, wherein balancing the network traffic load comprises distributing, in approximately equal portions, the network traffic load among the fully operational network appliances.

9. The method of claim 8 wherein, upon the network access control module receiving the first signal, the network access control module transmits a signal causing the first new network appliance of the plurality of network appliances operating in stand-by mode to transition to standard operational mode.

10. The method of claim 8 wherein upon determining that the network traffic load across at least two of said plurality of network appliances receiving full operational power exceeds a maximum load threshold level, the network appliance capacity module transmits a second signal to the network access control module that causes the network access control module to enter a suspension mode during which the network access control module ignores any additional signals transmitted such as a third signal associated with a second appliance of the at least two of said plurality of network appliances.

11. A method of claim 8 wherein when at least two of the plurality of network appliances are receiving full operational power and it is determined that at least one of the at least two network appliances has a network traffic load that is below a minimum load threshold level, reducing the power supplied to at least one of the at least two network appliances.

12. A method of claim 11, wherein the step of reducing the power supplied to at least one of the two network appliances is comprised of transmitting a signal from a switch to the at least one network appliance to engage the at least one network appliance stand-by mode.

13. A network system comprising at least:

a plurality of network appliances linked and configured to share a load of network traffic transmitted through a network, wherein the plurality of network appliances being configured to share the load of network traffic comprises the plurality of network appliances being configured to share, in approximately equal portions, the load of network traffic among the plurality of network appliances; and a network switch coupled to the plurality of network appliances, wherein the network switch includes a network access control module (NACM) configured to control a mode of operation of the plurality of network appliances, wherein the network access control module receives a stimulus indicating a load level of network traffic across at least one of the plurality of network appliances and transmits a signal in response to the stimulus indicating a load level that causes a transition from a first mode of operation to a second mode of operation within the network appliance of the plurality of network appliances that receives the signal, and wherein the NACM is further configured to suspend an ability for additional network appliance to be awakened for a predetermined period of time.

14. The network system of claim 13 wherein the first mode of operation is a stand-by mode and the second mode of operation is a standard operational mode.

15. The network system of claim 13 wherein the first mode of operation is a standard operational mode and the second mode of operation is a stand-by mode.

16. The network system of claim 13 wherein each of the plurality of network appliances includes a network appliance capacity module operative to communicate with the network switch regarding whether the network traffic load across each appliance is above a maximum network traffic threshold load level.

17. The network system of claim 13 wherein each of the plurality of network appliances includes a network appliance capacity module operative to communicate with the network switch regarding whether the network traffic load across each appliance is below a minimum network traffic threshold load level.

18. The network system of claim 13 wherein the mode of operation of the plurality of network appliances includes at least one fully operational network appliance.

19. The network system of claim 13 wherein the network access control module enters a suspension mode, following receiving a signal from a network appliance capacity module, during which the network access control module ignores any additional signals transmitted by network appliance capacity modules associated with additional network appliances of the plurality of network appliances that are fully operational.

20. The network system of claim 19 wherein the suspension mode is temporary and is removed following the performance of one of transitioning one of the plurality of network appliances from stand-by mode to standard operational mode and transitioning one of the plurality of network appliances from standard operational mode to stand-by mode.

\* \* \* \* \*